United States Patent [19]

Böttger

[11] 4,416,678

[45] Nov. 22, 1983

[54] METHOD AND APPARATUS FOR MAKING GLASS FILAMENT OR FIBERS

[75] Inventor: Diether Böttger, Hochheim, Fed. Rep. of Germany

[73] Assignee: Eglasstrek Patent Promotion & Awarding GmbH, Hochheim, Fed. Rep. of Germany

[21] Appl. No.: 318,319

[22] Filed: Nov. 4, 1981

[30] Foreign Application Priority Data

Mar. 24, 1981 [DE] Fed. Rep. of Germany ....... 3111484

[51] Int. Cl.³ .................... C03B 37/09; C03B 37/025
[52] U.S. Cl. ............................................ 65/2; 65/12; 65/DIG. 4; 65/1
[58] Field of Search ............ 65/1, 12, 2, 11.1, DIG. 4

[56] References Cited

U.S. PATENT DOCUMENTS

| | | | |
|---|---|---|---|
| 3,912,477 | 10/1975 | Brady et al. | 65/1 |
| 3,920,430 | 11/1975 | Carey | 65/1 |
| 3,988,135 | 10/1976 | Coggin | 65/1 |
| 4,178,162 | 12/1979 | Shono et al. | 65/1 |
| 4,249,398 | 2/1981 | Greene et al. | 65/1 |
| 4,270,941 | 6/1981 | Babbitt | 65/1 |
| 4,272,272 | 6/1981 | Grubka | 65/1 |
| 4,325,721 | 4/1982 | Jensen | 65/1 |

FOREIGN PATENT DOCUMENTS 540829 1/1977 U.S.S.R. ................... 65/1

*Primary Examiner*—Robert L. Lindsay, Jr.
*Attorney, Agent, or Firm*—Karl F. Ross; Herbert Dubno

[57] ABSTRACT

A forechamber or reservoir to which molten glass is fed, is provided with burners for heating the surface of the glass mass. The molten glass is conducted from the forechamber via at least one opening in its bottom wall into a vertically disposed intermediate chamber which is provided at its lower end with a nozzle heating plate having a plurality of orifices through which the mass is extruded. The intermediate chamber is provided with electrode heating elements so that the glass mass may be heated within the chamber. The height of the chamber is greater than its longitudinal length or diameter so that a laminar flow, caused by the head of the molten glass through the forechamber and intermediate chamber, is effected.

6 Claims, 5 Drawing Figures

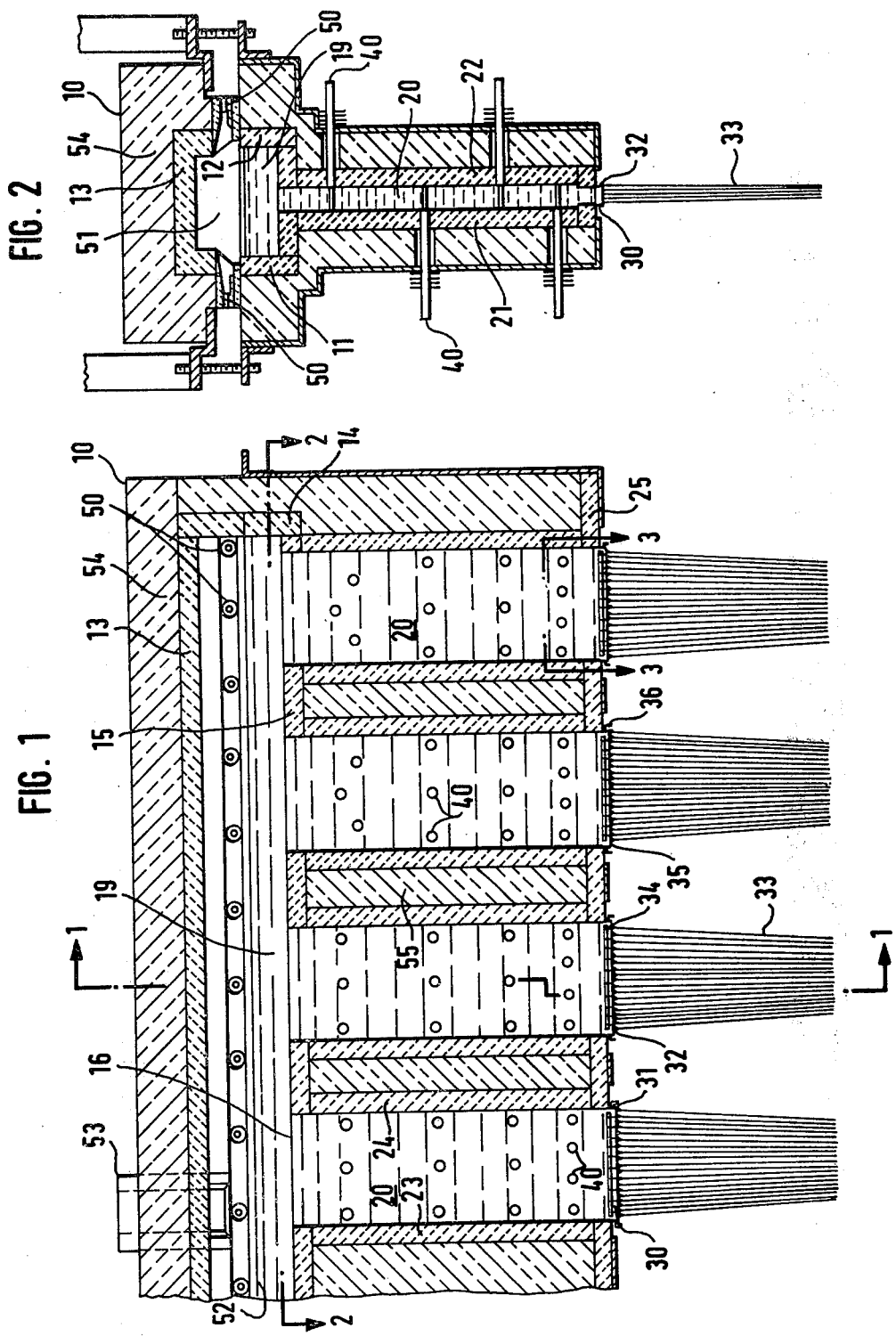

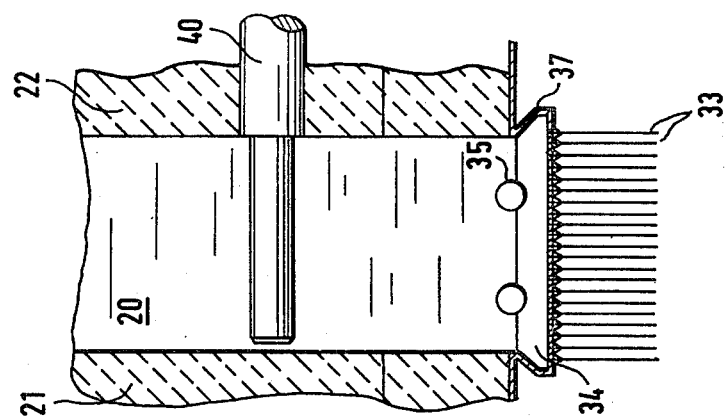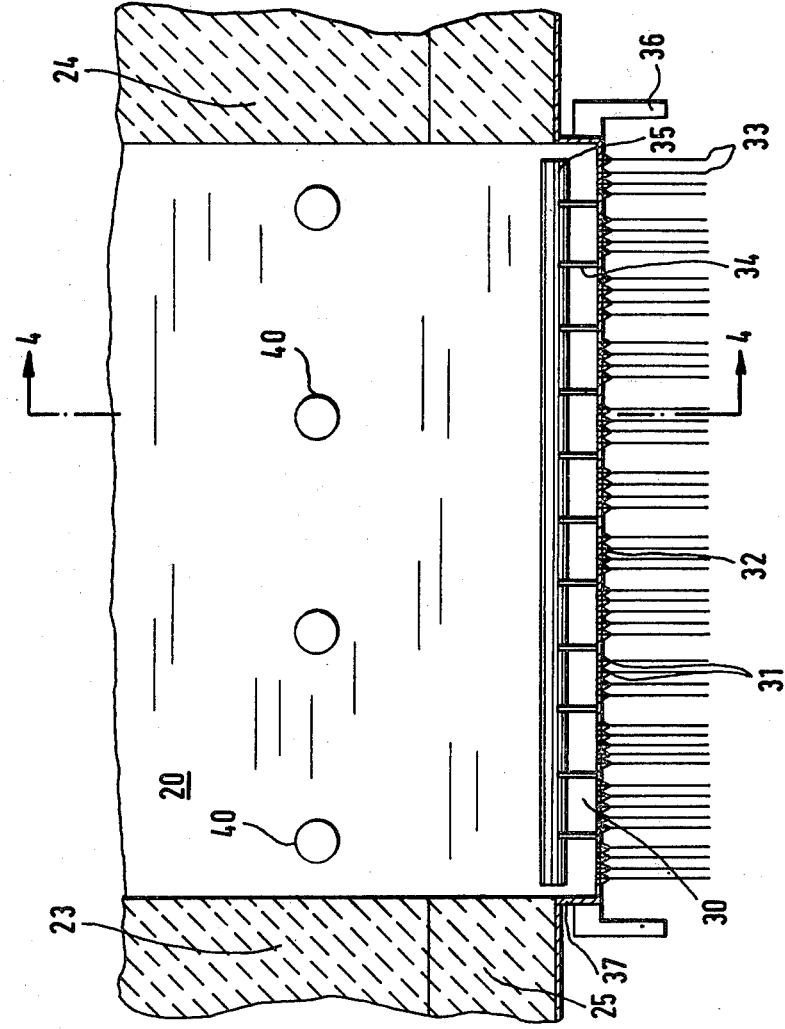

METHOD AND APPARATUS FOR MAKING GLASS FILAMENT OR FIBERS

BACKGROUND OF THE PRESENT INVENTION

1. Field of the Invention

The present invention relates to a method and apparatus for the production of glass fibers.

2. Background of the Invention

Apparatus for the production of glass fibers, such as for use in reinforcing plastics, or the production of elongated glass filaments, are known. In general, a molten glass mass is prepared in a furnace or the like and fed to a forechamber acting as a reservoir which is provided with one or more nozzles or nozzle plates through which the glass mass is extruded by gravity. Apparatus of this type is described in German Publication DT-AS No. 1158671.

Although the extrusion of the glass mass is effected by gravity, the known apparatus has the disadvantage that the forechamber can operate only with a glass mass column of only 200 to 250 millimeters above the nozzle plate. Known nozzle plates through which the molten glass is drawn comprise for example, a trough-type vessel of a platinum alloy which is provided with nozzles or nozzle tips, from which the molten glass can issue. The nozzle plate is connected as a resistance in a low voltage circuit and is thus electrically heated to maintain the molten glass contained therein in its molten state. Such vessels have the significant disadvantage that the temperature of the molten glass has a random characteristic as the temperature of the trough walls has a temperature gradient which decreases toward the upper edge leaving the highest temperature just above the bottom surface of the trough itself.

Due to the irregular temperature, additional turbulence results within the molten glass mass leading to frequent filament breaks and ruptures as well as the formation of irregular filament diameters.

It is also known that the glass mass in the forechamber must be heated to at least 1350° C., although the use of the conventional burners, in order to obtain at the nozzle, a useful operating temperature of 1240° C. These parameters limit the height of the glass column above the nozzles to no more than about 250 millimeters, as otherwise the temperature of the glass mass would have too strong a temperature gradient. On the other hand, it is known through the Hagen-Poiseuille equation, that a higher glass column or head producing a higher hydrostatic pressure above the nozzle plate, causes an increased flow rate and, hence, increased efficiency of the apparatus. The Hagen-Poiseuille equation is $$Q = \frac{KHD^4N}{vL}$$

where:
Q is the flow rate, per unit time,
K is a constant,
H is the height of the glass mass above the nozzle plate
D is the diameter of the nozzle tip
N is the number of orifices in the nozzle plate
v is the viscosity of the molten glass, and
L is the length of the nozzle tip.

3. Object of the Invention

It is an object of the present invention to provide a method of and an apparatus for the production of glass fibers wherein the flow rate can be significantly increased, the quality of the fibers optimized, and the subsequent treatment process further reduced or eliminated. Under certain conditions, even direct roving filaments can be produced.

SUMMARY OF THE INVENTION

According to the present invention, a method for the production of glass fiber and glass filaments is provided wherein the molten glass mass is fed to a forechamber or reservoir which is provided with conventional fossil fuel burners and/or by electrode heating means connected to a current source. The molten glass is conducted from the forechamber via at least one orifice in the bottom wall thereof into a vertically disposed intermediate chamber which is provided at its lower end with a nozzle heating plate having a plurality of orifices through which the mass may be withdrawn. The intermediate chamber is provided with electrode heating elements so that the glass mass may be homogeneously heated within the chamber. The height of the chamber is such that a laminar flow caused by the head of the molten glass through the forechamber and intermediate chamber is effected increasing the flow rate. The introduction of molten glass into the forechamber is maintained continuously, corresponding to the extrusion of the mass from the nozzle plate.

The heating electrodes, within the intermediate chamber, are controlled to provide a desired heating effect within the molten glass mass so as to maintain fluidity in the molten glass, provide homogeneity of temperature, and, if desired, provide for increased refinement of the molten glass within the intermediate chamber.

BRIEF DESCRIPTION OF THE DRAWING

In the accompanying drawing:
FIG. I is a longitudinal cross-section through an apparatus embodying the present invention;
FIG. II is a cross-sectional view taken along lines 1—1 of FIG. I;
FIG. III is a cross-sectional view taken along lines 2—2 of the FIG. I;
FIG. IV is a cross-sectional view taken along lines 3—3 of FIG. I; and
FIG. V is a cross-sectional view taken along lines 4—4 of FIG. IV.

SPECIFIC DESCRIPTION

Figure 3:
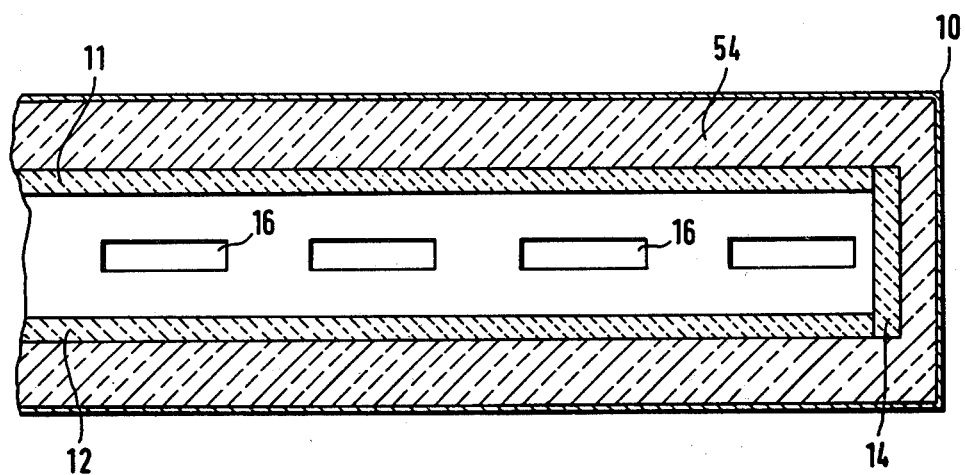

A forechamber or reservoir, shown in the drawings generally by the numeral 10, is fed in conventional manner with molten glass of a high specific resistance, from a tank furnace and distributor through a connecting channel. The glass composition and its method of melting are conventional and the apparatus therefor and for feeding the mass to the forechamber are not shown here. One or more forechambers may be employed in association with a single tank furnace.

The forechamber 10 consists of side walls 11 and 12, a cover 13, end walls 14 and a bottom wall 15 in which a plurality of slotted openings 16 are formed. The interior of the forechamber is denoted by the reference 19. The molten glass mass is fed to the forechamber 10 through the end wall not shown in the drawings by conventional means so that it does not completely fill the interior 18 but leaves an air cushion 51 which communicates with the atmosphere via a vent 53 passing through the cover. Conventional fossil fuel burners 50 extend through the side walls 11 and 11 and are located in the space of the air cushion 53 above the surface 52 of the glass mass.

The openings 16 in the bottom wall of forechamber 10 are spaced from each other in a longitudinal direction and have a cross-section corresponding to the form of a rectangular parallelogram. The openings 16 connect the interior 19 of the forechamber 10 with an intermediate chamber 20, the lower end of which is enclosed by a very shallow trough-type nozzle heating plate 30 having a plurality of apertures 31 through which the fibers are drawn. The openings 16 lead to the respective intermediate chambers 20 and are formed so that the molten glass mass enters the intermediate chambers directly from the interior 19 of the forechamber in a desired dynamic flow pattern. In the design shown, the cross-section of the intermediate chambers 20 and the corresponding openings 16 are the same. This need not be; rather the openings 16 may have a form other than that of the intermediate chamber so long as the suitably favorable dynamic flow pattern of the molten glass is maintained.

The aperture edge of the openings 16 may be lined with a sheet of platinum of small wall thickness for protection against corrosion.

Each of the intermediate chambers 20 are provided with side walls 21 and 22, end walls 23 and 24 and a bottom wall 25. The intermediate chambers may have a cross-section in the form of a rectangular parallelogram as shown or its cross-section may be round or oval. The height of each of the intermediate chambers is greater than its length when viewed in the lengthwise direction of forechamber. When the chambers are round or oval, its height should be greater than its largest diameter. It is preferred that the height be about two to three times the length of the chamber.

The forechamber and each of the intermediate chambers are located in a housing comprising insulated walls 54 supported in conventional manner on support brackets. The walls of the intermediate chambers are supported on insulated walls 55, which act to separate the adjacent intermediate chambers. Each intermediate chamber 20 is closed at its lower end by a nozzle plate 30 which is provided with orifices 31, which, to maintain a stable drawing process, are provided with well known nozzle tips 32, the ends of which are designed as run-off edges. Molten glass mass emerges freely from the nozzle tips and is drawn down by a suitable drawing device forming glass fibers 33, which are then wound on a roll. Both the drawing devices and winding devices are conventional and are not shown here.

Each intermediate chamber 20 is heated by a plurality of electrodes 40 which are connected with an electric current source. The electrodes are preferably made of molybdenum in a thickness of 5–10 mm. Such electrodes may, depending on the location of use, have a water cooling system or a finned cooling element. Such cooling devices and electrode assemblies are known and conventional.

In the design shown, the electrodes 40 pass through the side walls 21 and 22 and, thus, enter into the molten glass mass. It is essential that the electrodes 40 be arranged so that they are always completely emersed in the molten glass mass contained in the intermediate chamber. Care should, therefore, be taken that a corresponding flow of glass into the forechamber from the melting furnace, via the connecting channel, (not shown) be provided so that the introduction of the molten glass, corresponds to the sum of molten glass flowing through the total of nozzle plates. The electrodes 40 are arranged in groups and formed between them 2, 3 or more temperature control zones; zones being understood to mean the horizontal or vertical distance between two or more electrodes. Thus, the electrodes may be arranged horizontally or vertically in the chamber and may enter into the interior of the chamber from one or both sides. Depending on the form of the intermediate chamber, or the rate of flow of the molten glass mass, the electrodes may be arranged side by side, one above the other, and/or offset with regard to each other.

Preferably, the electrode group arranged nearest the lower end of the intermediate chamber i.e., adjacent the nozzle plate 30, is fitted with additional electrodes, or electrodes producing a greater amount of heat in order to provide the glass mass at this particular area with a temperature closest to that of the nozzle plate itself.

In the process of producing the glass filaments or fibers, according to the present invention, the molten glass mass passes from the forechamber to the nozzle plate through the intermediate chamber and by suitable control of the electrodes, is maintained at a homogeneous temperature within the intermediate chamber. The intermediate chamger, which may have a height, for example, 2000 millimeters, provides a hydrostatic pressure head of molten glass so that a high flow rate of molten glass is obtained with better fiber quality. Furthermore, within the intermediate chamber an intensive refining of the molten glass mass can be effected by control of the temperature therein.

Because of the high pressure weighing on the nozzle plate 30 caused by the elongated head of molten glass within the intermediate chamber, it is necessary to brace the nozzle plate 30 in order to prevent it from sagging or warping. To this end, a plurality of vertical metal sheets 34 are attached to the nozzle plate 30. The sheets 34 are spaced from each other and extend upwardly parallel to the side edge 37 (shown in FIG. 4) of the nozzle plate and are, in turn, connected with two or more rods 35 extending crosswise thereto. (see FIG. IV and FIG. V).

The side edges 37 of the nozzle plate 30 are kept as low as possible and electrical connections or terminals 36 are secured thereto to provide the electrical source for heating the nozzle plate. As a result of the low side edge 37, the electric current heats the bottom plate homogeneously with only a small part of the electric current being used to heat the side edge 37 itself.

The electrodes 40 and the bottom nozzle plate 30 are fed by a current source not shown, preferably three-phase alternating current source, which is supplied to the electrodes via a transformer and a control circuit. The control circuit may preferably include means whereby different power is supplied to the individual electrodes and thereby different temperatures of the glass mass inside the intermediate chamber can be equalized. Such control circuits are known and conventionally used.

In carrying out the present invention, the molten glass is fed from the initial furnace to the interior 19 of the forechamber so that the level 52 of the molten glass within the forechamber and intermediate chamber remains substantially constant, as fiber is drawn from the nozzle plate. The molten glass is heated by the conventional burners 15 and also heated within the intermediate chamber through the electrodes 40. Within the intermediate chamber the molten glass is homogeneously heated and has a laminar flow i.e. continuously produced by the pressure of the head within the vertical depending intermediate chamber 20. The glass filament is withdrawn through the nozzle plate while maintaining corresponding introduction of the glass fiber to maintain the forechamber and intermediate chambers with the molten glass head, substantially constant.

In the following table, a comparison is made between the production of glass fibers in a prior art device by the prior known method, and in three examples embodying the present invention. The examples, 1, 2 and 3, differ in the height of the molten glass column within the intermediate chamber, and the number of orifices in the nozzle plate. It will be readily evident from this table that the rate of production with the apparatus embodying the present invention is substantially greater and that the drawing speed is substantially reduced.

TABLE

| | Prior Art | Example | Example | Example |
|---|---|---|---|---|
| Height of Glass Column (mm) | 250 | 1000 | 1000 | 1500 |
| Size of Nozzle Plate (mm) | 55 × 375 | 90 × 360 | 110 × 430 | 145 × 550 |
| Number of Orifices | 800 | 4000 | 6000 | 12000 |
| Diameter of Orifices (mm) | 1,9 | 1,0 | 1,0 | 0,85 |
| Drawing Speed (m/Min) | 2939 | 1347 | 1347 | 1045 |
| Filament Thickness (Micron) | 10 | 10 | 10 | 10 |
| Textile # (g/1000m) | 160 | 800 | 1200 | 2400 |
| Rate of Production (kg/hour) | 28 | 64 | 96 | 150 |

It will be seen from the foregoing table that wide latitude in the height of the glass column, the area of the nozzle plate, the number of orifices and the diameter of the orifices can be varied within relatively wide limits.

As a result of the long residence time of the glass mass in the forechamber and in the intermediate chamber, the conditions of the glass may be improved by the ability to more intensively refine the molten glass within the intermediate chamber. This is not present in any of the kniown designs. As a result, the present apparatus is beneficial in the employment of molten glass suitable even for the production of extremely fine glass fibers or filaments. The homogeneity of the molten glass mass at the region of the nozzle plate insures excellent quality of glass fibers and eliminates, to a large extent, the danger of filament rupture during the drawing and winding processes.

By using electrodes for heating the glass mass within the intermediate chamber, a homogeneous temperature distribution and working temperature for final extrusion can be achieved without the need to ultra-heat the surface of the molten glass mass. By subdividing the glass mass into sequential temperature control zones, homogeneity of temperature can be obtained throughout the height of the forechamber and the intermediate chambers.

Temperature fluctuations and temperature gradiants within the glass mass above the intermediate chambers can be compensated for and negative influences due to temperature differences within the forechamber (as a result of heating by fossil fuel burner) can be eliminated in the intermediate chamber due to the length intermediate channel and the greater glass volume contained therein than in the equipment known until now. With this large glass volume, a long residence of the glass mass in the intermediate chamber is achieved, which has the advantage that a long time span is available for the elimination of gases from the glass. The provision of the space 51 above the glass mass permits voiding of the gas to the atmosphere. The intermediate chamber, further creates a zone which imposes a vertical laminar flow in the molten glass without turbulence, particularly as the molten glass reaches the drawing region of the nozzles.

The homogeneous heating of the glass column above the nozzle plate and the increase of the hydrostatic pressure permits the use of nozzle plates having orifices, the diameters of which can be significantly reduced over those of the prior art, thus, leading to finer glass fibers and, hence, to an easier drawing of the filaments wherein the filament rupture rate is reduced considerably.

The rate of flow of molten glass is considerably increased in the present apparatus by the increased pressure head so that the formation of a drop at the nozzle or orifice tip is produced in a shorter time. This further reduces the start-up time of production under otherwise unchanged conditions.

Because of the increased pressure head bearing on the nozzle plate, the nozzle tips in the bottom portion can be made considerably smaller, so that a total of 4,000 orifices can be provided on the bottom surface of a drawing nozzle plate having the size of 90 by 360 mm. On a bottom plate of 145 by 550 mm, accordingly, 12,000 orifices can be made. As a result of this direct roving or continuous filament of 2,400 tex are produced and subsequent treatment operations necessary in the prior art can be eliminated. In the case of nozzle plates having 4,000 to 12,000 orifices, it is possible to produce at low draw-off speed, filaments of 9 to 10 micron. In all the known described drawing nozzles having an orifice number of 4,000, a production could heretofore not be obtained. Downtime, in case of a filament rupture for the resumption of production is substantially reduced and, thus, the present apparatus is more economical than in the known equipment.

Various modifications, changes and embodiments of the present invention have been disclosed and suggested above. Various others will be obvious to those skilled in the present art. Accordingly, it is intended that the present disclosure be taken as illustrative only and not as limiting of the present invention.

What is claimed is:

1. An apparatus for making glass filaments which comprises:
    a substantially horizontally elongated forehearth receiving a supply of molten glass and formed in a floor thereof with a plurality of horizontally-spaced downwardly-open elongated passages;
    respective generally flat intermediate chambers extending downwardly from and communicating with said passages for conducting molten glass downwardly from said forehearth to bottom ends of said chambers, said intermediate chambers being provided with opposite generally flat juxtaposed walls between which a laminar flow of glass is confined;

respective nozzle plates at each of said bottom ends for extruding a multiplicity of glass fibers from corresponding orifices formed in plates;

heating means in said forehearth for heating the molten glass therein; and a multiplicity of electrodes assigned to each of said chambers and projecting into the laminer flows of glass therein from at least one of said walls of each chamber and approaching the opposite one of said walls of the respective chamber whereby an electric current passed between electrodes of each chamber flows through the glass therein to resistively heat the same.

2. The apparatus defined in claim 1 wherein said chamber has a rectangular cross section.

3. The apparatus defined in claim 1 wherein said heating means includes electrodes extending into the glass in said forehearth for passing an electric current therethrough to resistively heat the glass therein.

4. The apparatus defined in claim 1 wherein said heating means includes fossil fuel particles in said forehearth.

5. The apparatus defined in claim 1 wherein said electrodes of each chamber increase in number downwardly toward the respective bottom end.

6. A method of producing glass filaments which comprises the steps of:

heating a stream of molten glass while passing it horizontally through a forehearth;

diverting glass from said stream downwardly through intermediate chambers of elongated cross section between pairs of closely juxtaposed walls of said chambers in substantially laminer streams;

heating the glass of each of said streams within said chambers by passing an electric current directly through the glass of said streams between electrodes projecting from at least one of the walls of each chamber into the respective glass stream and extending toward the other wall of the respective chamber; and extruding filaments from each of said streams through an orifice of a nozzle plate at the bottom end of each of said chamber.

* * * * *